United States Patent
Agronow et al.

(10) Patent No.: US 7,529,835 B1
(45) Date of Patent: May 5, 2009

(54) WEBSITE CHANGES TO SCALABILITY, CAPACITY, SERVER IMPACT, BANDWIDTH AND END-USER PRESENTATION BASED ON A TRIGGERED EVENT

(75) Inventors: Dan Agronow, Douglasville, GA (US); Todd Richards, Marietta, GA (US)

(73) Assignee: The Weather Channel, Inc., Atlanta, GA (US)

(*) Notice: Subject to any disclaimer, the term of this patent is extended or adjusted under 35 U.S.C. 154(b) by 641 days.

(21) Appl. No.: 10/742,962

(22) Filed: Dec. 22, 2003

(51) Int. Cl.
*G06F 15/16* (2006.01)
*G06F 15/173* (2006.01)

(52) U.S. Cl. .................. 709/226; 709/203; 709/217; 709/219; 709/223; 709/224

(58) Field of Classification Search ......... 709/223–224, 709/203, 217, 219, 229
See application file for complete search history.

(56) References Cited

U.S. PATENT DOCUMENTS

| | | | |
|---|---|---|---|
| 6,243,761 B1* | 6/2001 | Mogul et al. ............... 709/246 |
| 6,480,883 B1* | 11/2002 | Tsutsumitake ............. 709/203 |
| 6,662,233 B1* | 12/2003 | Skarpness et al. ........... 709/246 |
| 6,876,988 B2* | 4/2005 | Helsper et al. ............... 706/21 |
| 7,099,799 B2* | 8/2006 | Huard ........................ 702/186 |
| 2002/0004705 A1* | 1/2002 | Baron et al. ................. 702/3 |
| 2002/0107936 A1* | 8/2002 | Amon ........................ 709/217 |

\* cited by examiner

*Primary Examiner*—Ario Etienne
*Assistant Examiner*—Philip J Chea
(74) *Attorney, Agent, or Firm*—Woodcock Washburn LLP (57) ABSTRACT

Methods for altering content on a Web site in accordance with triggering events. Normal and alternate versions of Web site content are created, where the alternate version is a less complex and computationally expense and utilizes a reduced amount of bandwidth to be transmitted to users. When an event occurs, all or portions of the Web site are switched from the normal version to their respective alternate versions to reduce server load and bandwidth requirements so a high number of users can be served the pages. The switch from normal to alternate versions may be for all visitors of selected classes of visitors, such as those from certain geographic regions.

25 Claims, 9 Drawing Sheets

WEBSITE CHANGES TO SCALABILITY, CAPACITY, SERVER IMPACT, BANDWIDTH AND END-USER PRESENTATION BASED ON A TRIGGERED EVENT

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2003, The Weather Channel, All Rights Reserved.

FIELD OF THE INVENTION

This invention relates in general to the field of Web site capacity planning. More particularly, this invention relates to a system and method for altering content in response to anticipated or actual increases demands for particular Web pages in order to increase the number of pages served without the necessity of adding hardware to meet the increased demands.

BACKGROUND OF THE INVENTION

More and more people are turning to the Internet for shopping, services and information about news and weather. While general usage has been increasing steadily, non-recurring events, such as breaking news, severe weather, etc. create tremendous spikes in bandwidth and pageviews as large numbers of users consult a relatively few number of news and weather sites for information at once. Many content providers have responded to periods of high usage by increasing their server and bandwidth capacities through costly hardware upgrades. However, this is disadvantageous, as these content providers are purchasing and maintaining more capacity than necessary for regular usage, which wastes resources and capital investment.

Other content providers that cannot afford hardware upgrades have another, perhaps more troublesome problem, in that they cannot meet the demands placed upon their Web sites during period of high usage. For these content providers, the increases in pageviews are too much for their server systems, which results in users being served an error page or experience extremely slow response times during significant events. Users receiving these problems become frustrated and alienated and turn (often permanently) to other Web sites for their information.

Thus, there is a need for a solution to the above-mentioned problem of handling period of high usage, without the need for costly hardware upgrades. For example, there is a need for a system that can serve double, or more, of normal levels of traffic without significantly impacting the user experience and bandwidth costs in a negative way. The present invention provides such a solution.

SUMMARY OF THE INVENTION

The present invention is directed to methods for altering content on a Web site in accordance with triggering events. According to one aspect of the invention, there is a method for altering Web site content in accordance with the occurrence of an event. The method includes serving normal versions of Web pages; monitoring for the event; and triggering upon the occurrence of the event to switch from a normal version of predetermined pages to an alternate version of the predetermined pages. The alternate versions of the predetermined pages are then served by the Web site. The normal versions have a first level of content, and the alternate versions have a second level of content that is less than the first level of content.

In accordance with a feature of the invention, the method includes determining geographic regions experiencing the event, and serving the alternate versions of the predetermined pages only to those geographic regions. Also, all geographic regions may be served an alternate version of the Web site home page.

In accordance with another feature, the second level of content comprises a reduced amount of graphics as compared to the first level of content. For example, there may be fewer graphics on the web page, or the same graphics but smaller in dimensions or the graphics may be displayed in 256 colors or less to reduce bandwidth requirements. Optionally, the alternate versions may be static Web pages or pages that have reduced database calls for information to be supplied therein. Additionally, the alternate versions may be dynamic or static Web pages that have less content to reduce the size of the page (less bandwidth) and require less server processing to generate the page.

The method may also include providing information related to the event in the alternate versions of the predetermined pages and providing only links to other information that would otherwise be displayed on the normal versions of the predetermined pages in the alternate versions.

Optionally, the method may modify the HTML base in the alternate versions to reduce backward compatibility with older browsers that are supported by the normal versions.

The event may be an increase in bandwidth requirements placed on the Web site, or the event may be non-recurring, which causes an increase in demand for the predetermined pages.

In accordance with another aspect of the invention, there is provided a method of a number of pageviews that can be served by a Web server. The method includes monitoring for a higher demand for predetermined pages served by the Web server; preparing normal and alternate versions of the predetermined pages, the normal versions have a first level of content, and the alternate versions have a second level of content that is less than the first level of content; after sensing the higher demand for the predetermined pages, switching from the normal version of the predetermined pages to the alternate version the predetermined pages; and serving the alternate versions of the predetermined pages to visitors of the Web site from geographic locations identified as being sources of the higher demand.

According to another aspect of the invention, there is provided a method of operating a Web site to adjust content served thereby in accordance with user demand for predetermined pages. The method includes monitoring for an event indicative of user demand for the predetermined pages; switching from a normal version of the predetermined pages to an alternate version of the predetermined pages after determining the existence of the event; serving the alternate version of the predetermined pages until the event concludes and thereafter resuming serving the normal version of the predetermined pages.

According to a feature of the invention, the alternate version of the predetermined pages are served to specific classes of users visiting the Web site. Herein, a specific class of users may be users from predetermined geographic regions where the event occurs.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
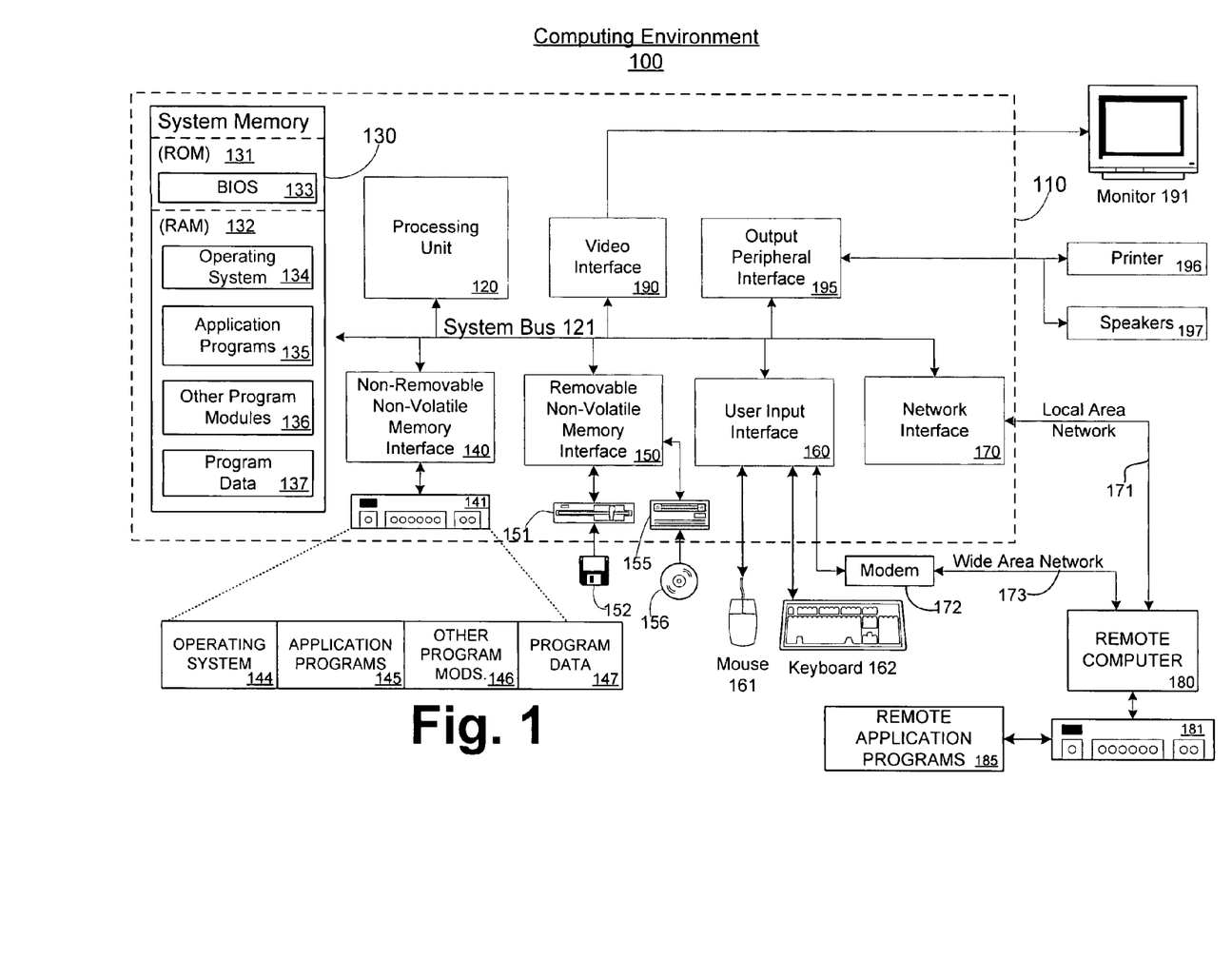
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments of the Present Invention

The present invention is directed to reducing the cost of serving Web pages in accordance with an anticipated or actual demand for specific pages due to an event. In accordance with the present invention changes are made to the Web pages beyond simply removing graphics from existing pages, rather, changes are made such that entirely different pages are created and published during events that cause high demand.

In the exemplary embodiment below, the website that implements the present invention is weather.com® and the event that causes a high demand for web pages is severe weather event in a portion of the United States. The severe weather event places the weather.com® site into a "High Usage Mode" called "Severe Weather Mode." The two terms may be used interchangeably herein below. As will become evident to one of ordinary skill in the art, the High Usage Mode of the present invention is applicable to any event that may cause a high demand for Web pages, such as breaking news, on-line holiday shopping, special promotions, on-line auctions, etc.

The High Usage Mode includes three main features: site changes, functionality changes, and process changes. The site changes are made to the Home Page, News Pages, City Pages, and Map Pages (the pages of the site typically receive the highest traffic). The functionality changes are made to include a Severe Weather Mode City Selector and changes to map looping. The process changes are directed to how the weather.com® Web site is placed into, and out of, the High Usage Mode.

Figure 2:
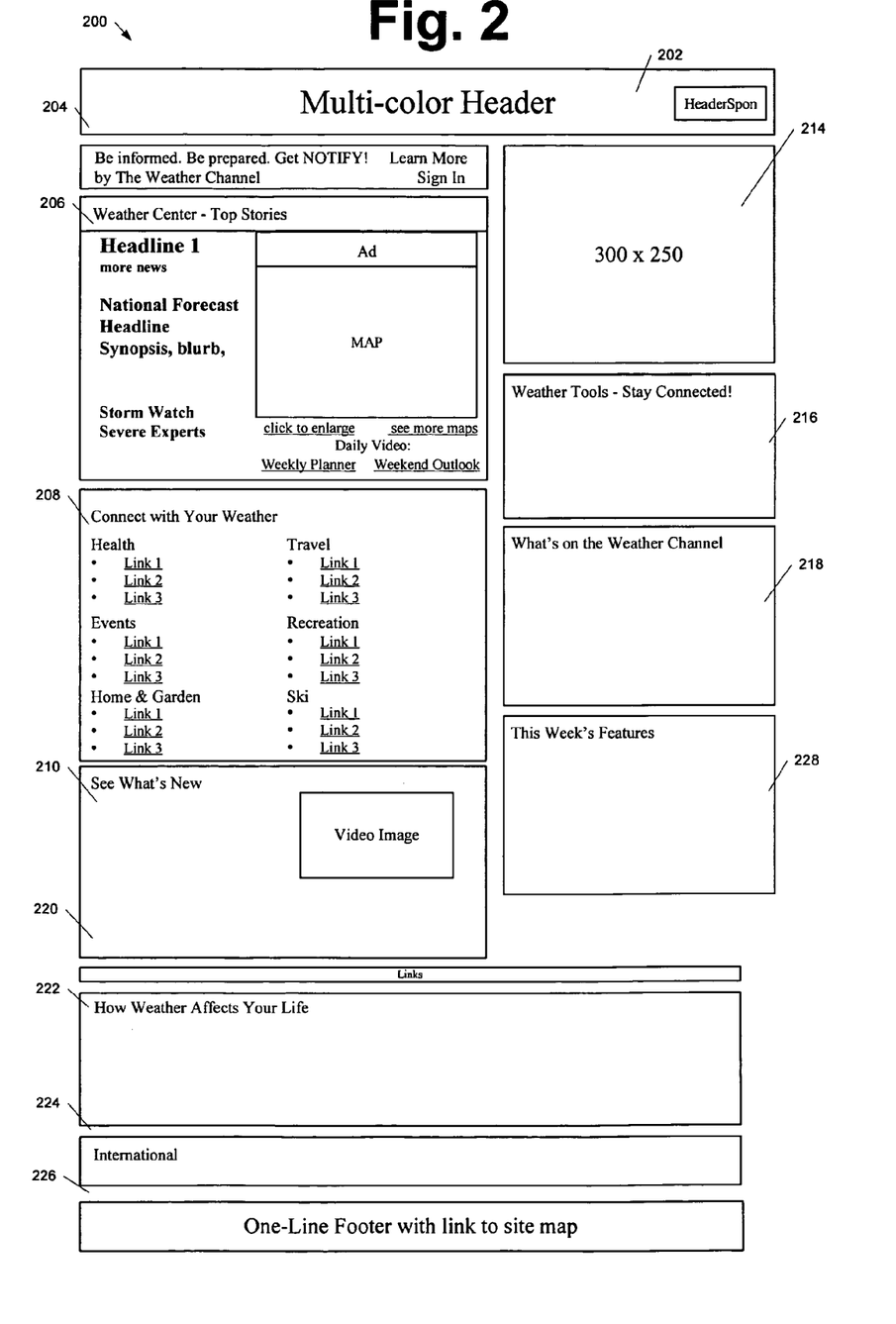
FIG. 2 is an exemplary storyboard for a web site home page under normal conditions.

Referring now to FIG. 2, there is an exemplary storyboard of the weather.com® Web site under normal conditions. FIG. 2 illustrates how a web page 200 served by a weather.com® server would be presented to a user when severe weather conditions do not exist or are not anticipated. The web page 200 includes several sections 202-228 that provide different types of information to weather.com® users. In particular, a multi-color header 202 provides for global navigation and a link to a sponsor (HeaderSpon) Web site. A Notify! service section 204 is provided as a text message promoting the weather.com® Notify! Service (or other service) and may include a message followed by links to learn more and sign. The Weather Center 206 provides weather stories of national interest and a map of the current surface conditions (e.g., rain, snow, fog) throughout the United States. The Weather Center 206 contains the map, an ad position, and several links to deeper pages. Also included are the Top Story Headline, a title for the National Forecast and text links to a Storm Watch Page.

Other sections of the weather.com® home pages (208, 210, and 222) provide links to various topical information and how weather affects various aspects of a user's day-to-day activities. For example, the weather.com® web site may provide links 208 to travel destinations, events, etc. and weather forecasts for such destinations and events (Connect with Your Weather). The travel information may also include additional details about the destination selected by the user.

General weather information links 222 may be provided to other information, such as health, driving, events, recreation, home & garden, world, news, weather tools, interactive, education, multimedia, shopping, and TV, as they relate to weather may be provided. International weather 224 may also be provided on the home page 200. Also, links 220 to make weather.com® the user's homepage, or to contact weather-.com® with feedback may be provided under normal conditions.

Prominent ads 214 may be displayed in an area by selected sponsors of the Web site. Weather tool links 216 may be provided by weather.com® to enable users to be alerted about weather conditions, etc., as well as graphical information 218 regarding programming on The Weather Channel. Features 228 of the weather.com® Web site may be highlighted and footer navigation 226 provides links to other weather related information.

It is noted at each of the portions of the Web page 200 (i.e., graphics and text information identified by reference numerals 202-228) utilizes server and bandwidth resources as they are fetched and communicated to users' browsers. Thus, as is now understood, the weather.com® home page 200 as described in FIG. 2 is a comprehensive source of information that requires the serving of multiple images and text information. However, in instances where there is severe weather affecting a portion or portions of the country, serving the normal home page of FIG. 2 places an extreme burden on the weather.com® servers and bandwidth capacity because of the expected increase in the number of users visiting the site. Accordingly, in accordance with the present invention, an alternate, less complex home page is automatically generated and served when the web site is placed into the High Usage Mode.

Figure 3:
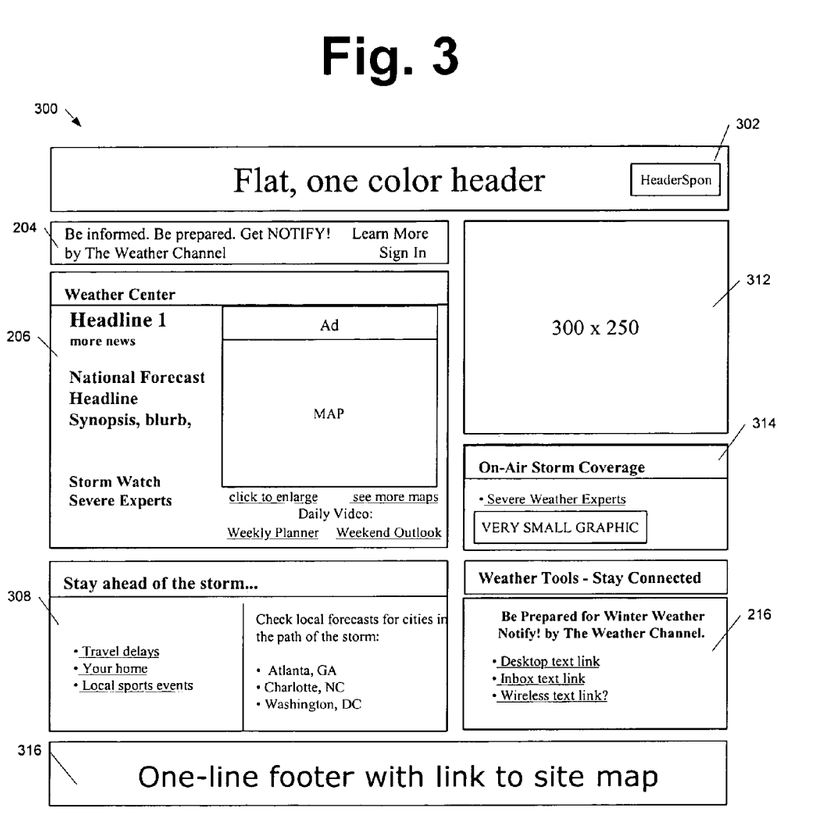
FIG. 3 is an exemplary storyboard for a web site home page under high usage mode.

Referring now to FIG. 3, there is illustrated an exemplary storyboard of the weather.com® home page 300 when the weather.com® web site is operating in the High Usage Mode. The home page 300 is designed to communicate the urgency of the situation (i.e., severe weather), uses one or few colors and text, contains few or no images, may allow for sponsor ad in the header, and presents global navigation and search dialog without images.

The home page 300 includes a one color header 302 having an optional sponsor link (HeaderSpon). The text message 204 promoting the Notify! service is provided as in the home page 200 under normal operations. The Weather Center 206 is also substantially similar to that provided in the normal home page 200. Links 308 provide information related to locations and conditions in cities affected by the severe weather conditions.

A simple ad 312 is placed on the right-hand side of the home page 300. Links 314 promoting On-Air Storm Coverage on The Weather Channel are provided to guide users to The Weather Channel for additional information. The Weather Tools Module 216 contains text links to various weather tools such that users can track the storm progress. A one-line footer 316 replaces the footer navigation 226, however, it includes a single (or few) color(s). The footer 316 also provides footer navigation links back to the home page, a site map, contact information, etc.

As illustrated in FIG. 3, the home page 300 served by weather.com® when the High Usage Mode is active is substantially reduced in content and complexity in order to allow the weather.com® servers to meet the expected load due to higher number of users visiting the site during severe weather conditions. While reduced in content, the less complex home page 300 through its less complex graphics and text links maintains a pleasing user experience.

Figure 4:
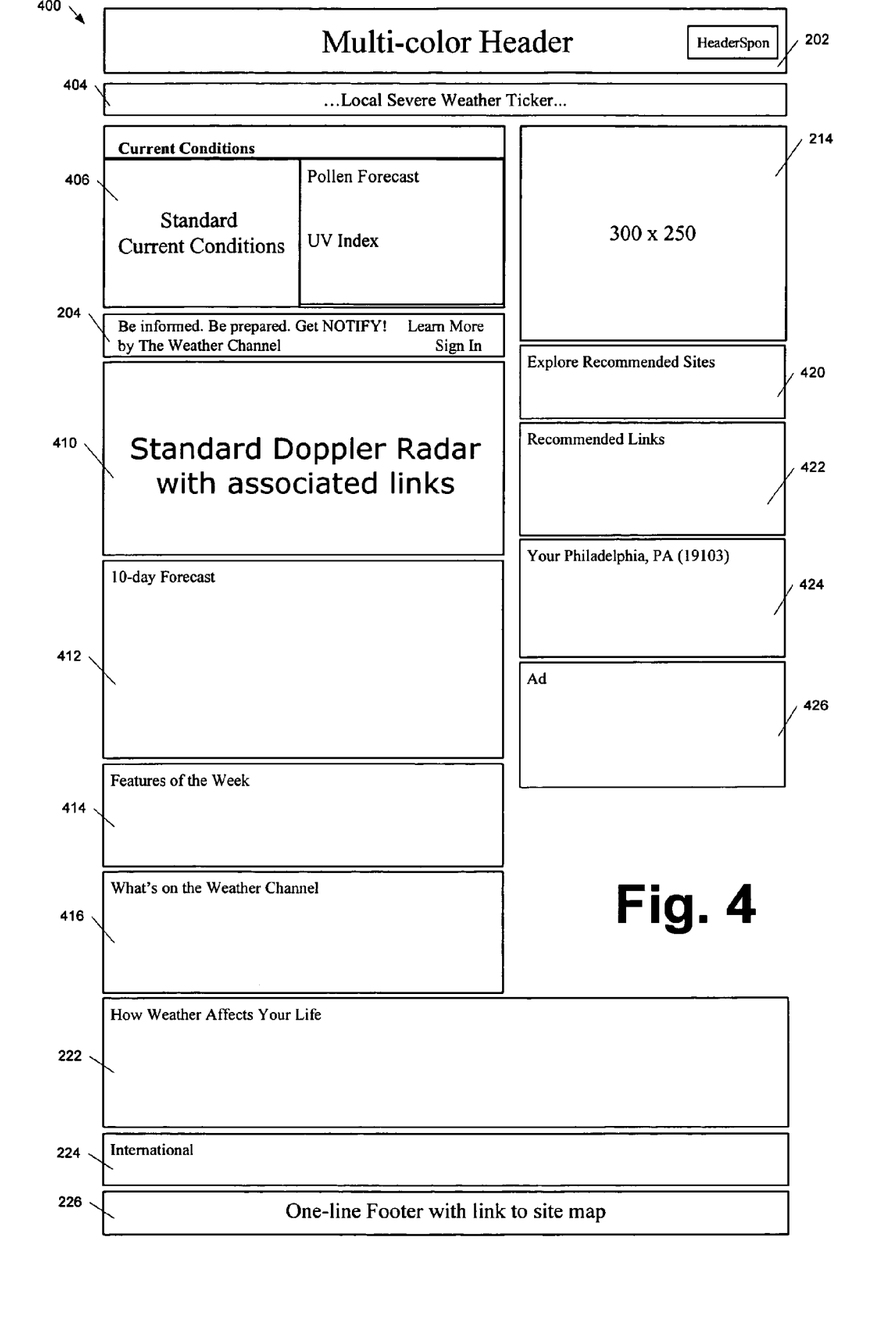
FIG. 4 is an exemplary storyboard for a web site local weather information page under normal conditions.

Referring now to FIG. 4, there is illustrated a storyboard of a city/local activity Web page 400 as served by weather.com® under normal conditions. The multi-color header 202 provides global navigation and may provide a link to a sponsor (HeaderSpon). A weather ticker 404 provides a scrolling text link to a severe weather report from, e.g. the weather service location nearest to the city/location of interest. A city page 406 includes a split view and includes graphical and text information regarding current conditions, and graphical/text links to, e.g., a pollen and UV forecast.

The Notify! section 204 of the local page 400 is the text message promoting the Notify! Service (or other service) and may include a message followed by links to learn more and sign in pages. The Notify! section preferably is displayed in text to guide user to the Notify! service or to sign-in. A 600-mile Doppler radar image 410 for the selected city/location is also provided.

A 10-day Forecast Module 412 displays the 10-day forecast for the location of interest containing links or buttons, etc., to the forecasts and averages and records pages, instead of displaying the entire 10-day forecast. The 10-day Module 412 contains graphical links to each of the next 10 days, as well as links to hourly forecasts, details, averages and records. Features of the Week 414 are provided as text links to relevant weather-related information, such as cold and flu reports in the winter, etc.

As in the home page 200, links 222 may be provided to information, such as health, driving, events, recreation, home & garden, world, news, weather tools, interactive, education, multimedia, shopping, and TV, as they relate to weather. International weather information 224 may also be provided and navigation links 226 to other weather related information.

Ad area 214 is provided to display sponsor information, however, in the local page 400, the ads may be specific to the city/location entered by the user. Recommended sites 420 may be promote through graphics and links, whereas other sites may be promoted through text links 422. Local weather information links 424 and a smaller ad section 426 may also be served as part of the local page 400.

The local page 400 as described in FIG. 4, like the home page 200, serves as a comprehensive source of local information that requires the serving of multiple images, graphics and text information. When a severe weather event affects a city or local area, serving the normal local page of FIG. 4 also places a burden on the weather.com® servers and bandwidth capacity because of the expected increase in the number of users visiting the weather.com® Web site from affected locations. Accordingly, in accordance with the present invention, an alternate, less complex local page is automatically generated and served when the web site is placed into the High Usage Mode. This local page will now be described with reference to FIG. 5.

Figure 5:
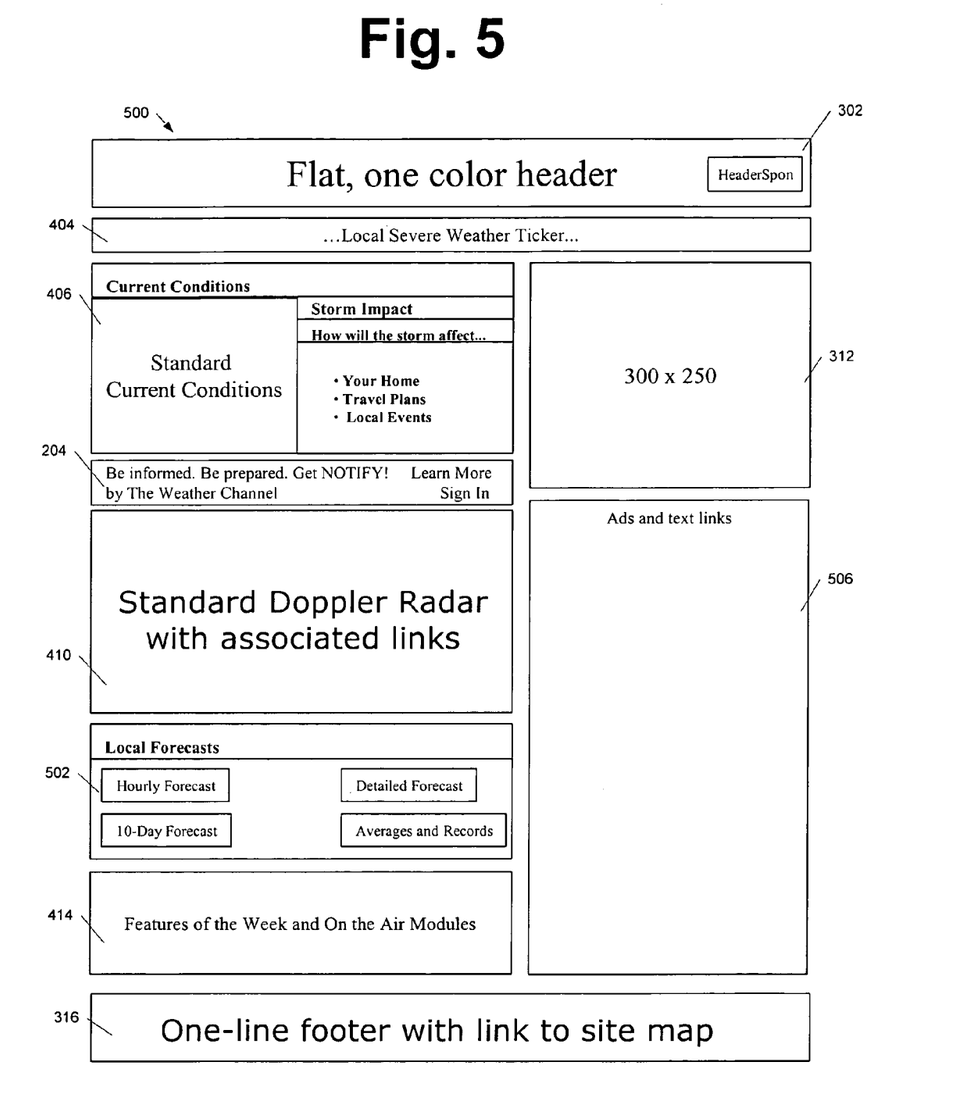
FIG. 5 is an exemplary storyboard for a web site local weather information page under high usage mode.

FIG. 5, is an exemplary storyboard of a city/local activity page 500 that is served by weather.com® under High Usage Mode. In accordance with a feature of the invention, only the local pages for the regions experiencing severe weather are put into High Usage Mode, whereas other regions of the country receive the local page 400 appropriate for their location. Thus, a user in the Northeast may see the local page 500 when severe weather affects the Northeast Corridor, while a user in sunny, southern California would see the local page 400. Thus, certain classes of users (e.g., users from particular geographic locations) can be identified as placing the largest burden on the servers and only the identified classes of users receive the alternate, High Usage Mode pages.

To implement the selective local High Usage Mode, each location in a location master database are assigned to one of nine regions. Thus, selected ones of the nine regions may be placed into the High Usage Mode based on expected weather conditions. Once the selected region(s) for High Usage Mode have been selected, a trigger (described below) points all locations within that region to the High Usage Mode version of the city page (i.e., local page 500).

Turning to FIG. 5, the header 302 in the city/local activity page 500 is designed to communicate the urgency of the situation and uses one (or few) colors and text, no images, allows for the placement of an optional sponsor ad (Header-Spon), and presents global navigation and search options without images. The weather ticker 404 provides a scrolling text link to a severe weather report from, e.g. the national weather service location nearest to the city/location of interest. The city page 406 retains the same split view, however, the right-hand side provides only text links to direct users to deeper vertical content. The messaging around the links preferably indicates the connection between the severe weather conditions and the links that are presented.

The Notify! section 204 of the local page 500 is a text message promoting the Notify! Service (or other service) and may include a message followed by links to learn more and sign in pages. The Notify! section preferably is displayed in text, without images. The 600-mile Doppler radar image 410 for the selected city/location is also provided. However, during High Usage Mode, the number of images used in the map loop is reduced from six to four. This significantly reduces an expensive function of the Web site.

A Forecast Module 502 displays links or buttons, etc., to the forecasts and averages and records pages, instead of displaying the entire 10-day forecast, as in local page 400. The Module 502 preferably contains links to the Hourly Forecast, 10-Day Forecast, Detailed Forecast, and Averages and Records. The 10-day forecast is preferably presented on a new page, which will be discussed with reference to FIG. 6. The other links direct users to existing pages that have the header 302. The footer 316 is a one-line footer having a single (or few) colors and links to key areas of the site, as discussed above. Ad space 312 is provided for a simple ad from a local sponsor, and space 506 is provided for additional ads and text links.

Thus, the local page 500 served by weather.com® when the High Usage Mode is active is substantially reduced in content and complexity only for those locations experiencing severe weather to allow the weather.com® servers to meet the demand of the higher number of users visiting the site from those locations. Here again, while the local page 500 is reduced in content through its less complex graphics and text links, it maintains a satisfactory user experience.

Figure 6:
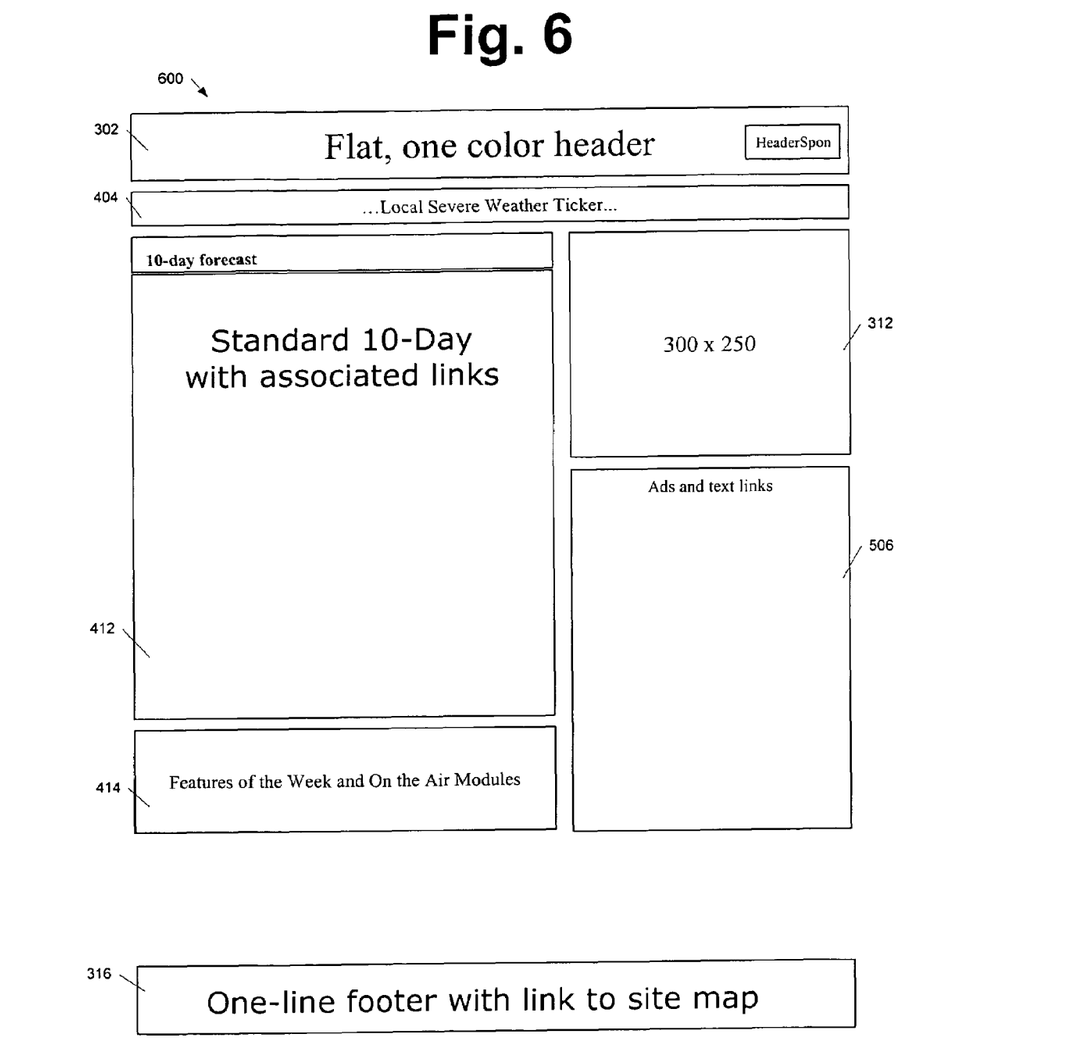
FIG. 6 is an exemplary storyboard for a web site local 10-day forecast information page under high usage mode.

Referring now to FIG. 6, there is illustrated an exemplary storyboard for the 10-day forecast when the site is operating in High Usage Mode. The elements of the 10-day Forecast page 600 were discussed above will not be described again. It is noted that page 600 is only provided for locations in High Usage Mode and is not provided for locations operating in a normal mode, as the 10-day forecast module 412 is normally presented on local activity page 400.

Figure 7:
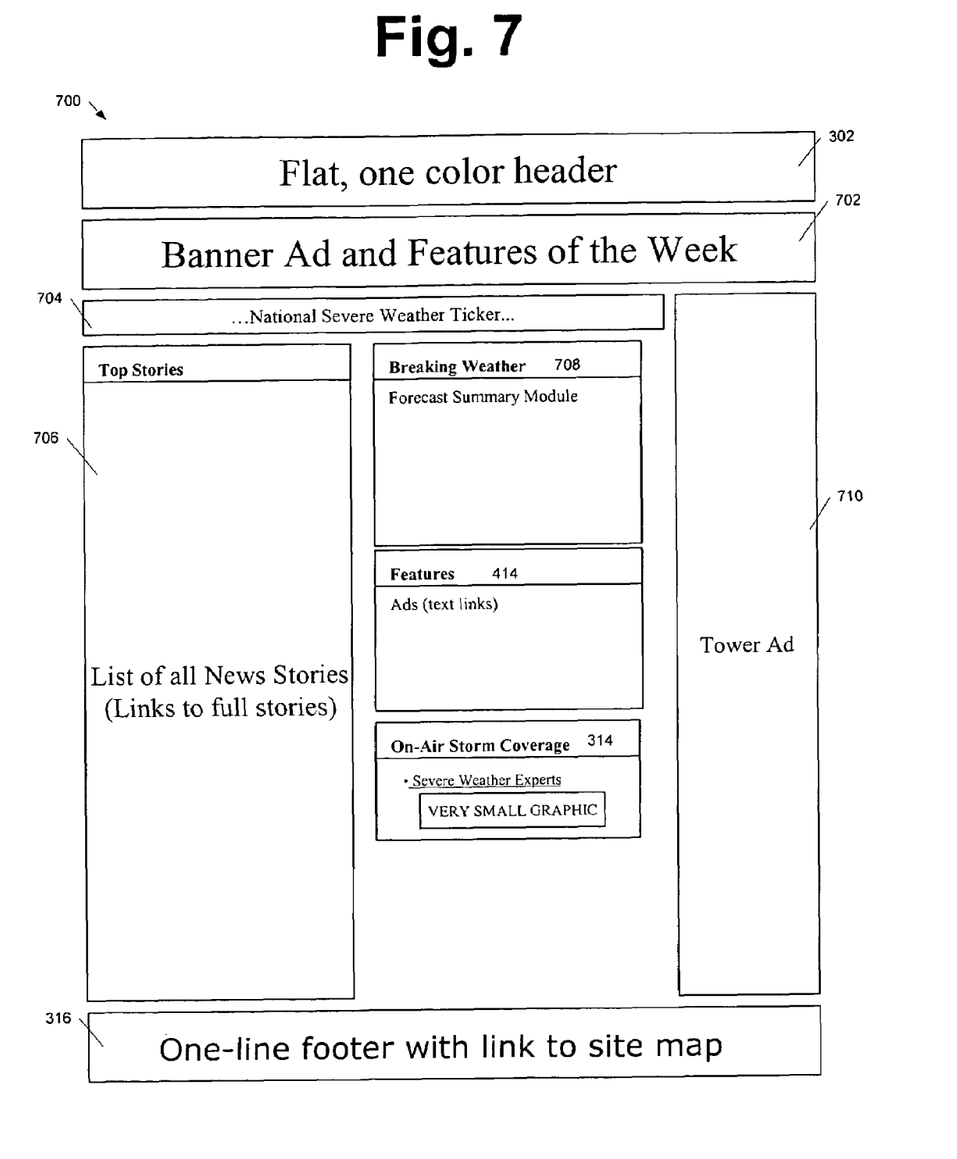
FIG. 7 is an exemplary storyboard for a web site local news information page under high usage mode.

Referring now to FIG. 7, there is illustrated an exemplary storyboard of a news index page 700. The page 700 includes the header 302 and a banner ad and features of the week section 702 that provides links to a sponsor and featured sites. A National Severe Weather Alert Ticker 704 provides a link to different lists based on alert type. The national ticker 704 is modified to be a set of links, rather than a scrolling ticker in normal mode. A Top Stories 706 section provides headlines that serve as links to the full text stories. Breaking Weather links 708 are provided to convey summaries of immediate interest. A simple one or few color tower ad 710 is provided to promote a sponsor. The one line footer 316 is also provided. Under normal conditions, the news page contains substantially similar information, however, utilizes more complex graphics.

Figure 8:
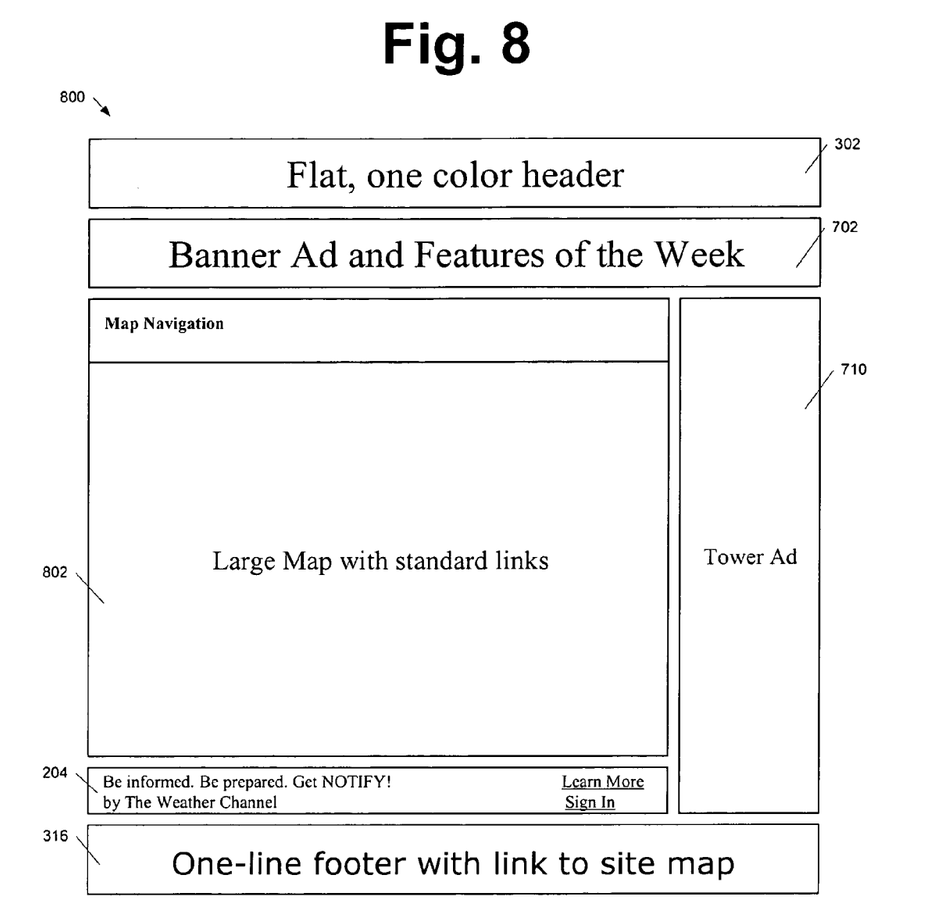
FIG. 8 is an exemplary storyboard for a web site local map information page under high usage mode.

Referring now to FIG. 8, there is illustrated an exemplary storyboard of a large maps page 800 that displays various map-based images (e.g., Doppler Radar 600 Mile, Doppler Radar 300 Mile, Doppler Radar 100 Mile, Satellite, forecast, etc.) and links 802 to the images. In High Usage Mode, the page 800 includes the header 302 and banner ad and Features of the Week 702. The tower ad 710 is also provided along with the Notify! section 204 and the one-line footer 316. Under normal conditions, the large maps page contains substantially similar information, however, utilizes more complex graphics.

Figure 9:
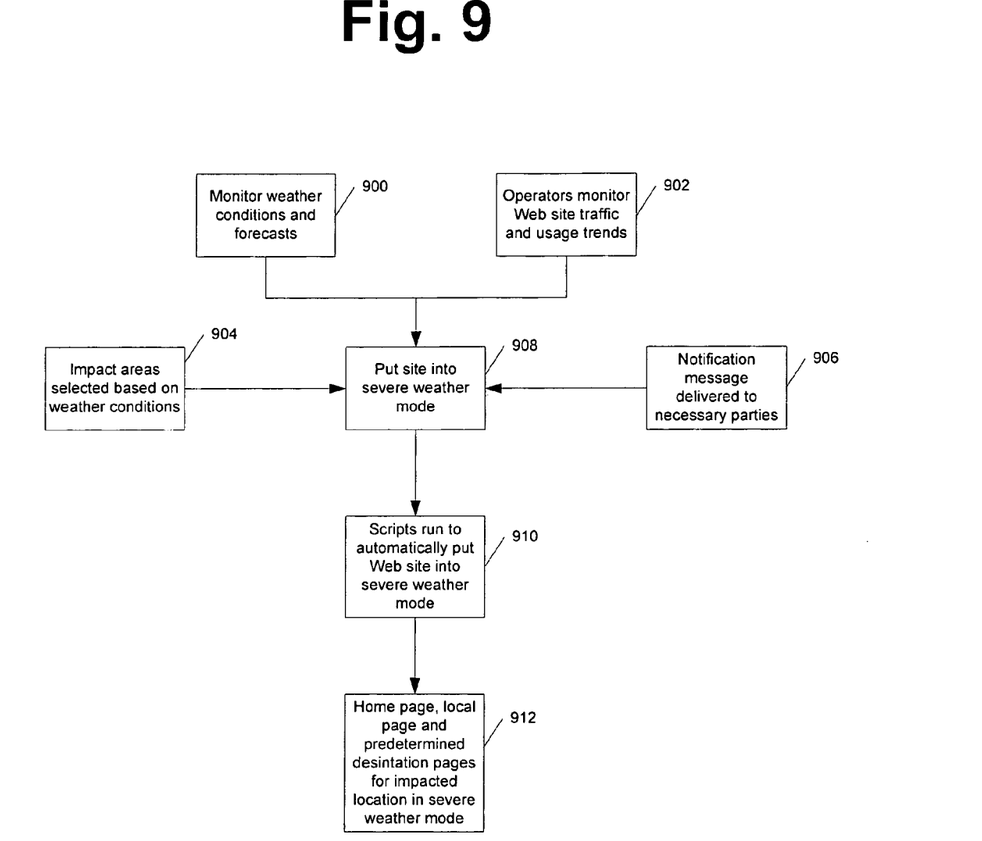
FIG. 9 is a flow chart of the processes performed to place a web site into the high usage mode of operation.

Referring now to FIG. 9, there is illustrated a flow chart of the processes performed to place a Web site into High Usage Mode. High Usage Mode is initiated based on one or more triggers, shown as 900, 902 and 904. A first trigger is the expected impact that severe weather may have on each region of the country. For example, if a large storm is forecast for the Northeastern United States, the home page and local pages for cities in the Northeastern United States may be placed into High Usage Mode at step 908. The second triggering event is unusually high traffic. Traffic at the Web site may be monitored from predetermined geographical locations (e.g., each state) in real time. While, highly localized events seem minor when compared to the national forecast, they can be significant traffic drivers to the Web site. In these cases, the Web site can be placed into High Usage Mode for the impacted region (s). It is noted that the triggers may be automatic or manual. For example, if usage increases beyond a bandwidth threshold or server capacity threshold, or a forecast for a region indicates severe weather, the site may automatically enter High Usage Mode. Under manual operation, the process for entering High Usage Mode may require human-in-the-loop intervention, such as inputs from necessary parties 906 (e.g., forecasters, an Editorial Director, a VP of Technology, etc.).

Once it is determined that the forecasts or usage requires activation of High Usage Mode at step 908, a series of logical switches transform the site from normal operation to High Usage Mode. Examples of such switches are an electronic form that is completed by the Editorial Director or automatically based on the triggering event. This form identifies which regions should be put into High Usage Mode and also highlights any specific sections of the site that should be promoted during the event causing high usage. A second switch involves publication of the form where information in the form is used to determine how each page of the site is automatically generated (step 910). For example, each page has components which are designed in two versions (normal and an alternate for high usage mode). The servers read the form to determine which version of a particular page to communicate to users for display at a particular location (step 912).

It is noted that the embodiment described herein is with reference to the weather.com® Web site, however, the present invention may be implemented on any Web site providing any content. For example, a news provider may implement a High Usage Mode when breaking news occurs in order to meet anticipated demand for national or local news on the site. Also, merchants may implement a High Usage Mode during holiday rushes and promotions for their home pages and selected product pages. As is now evident to one of ordinary skill in the art, the High Usage Mode will enable Web site operators to meet the demands caused by surges in usage by automatically redesigning their sites to provide leaner content without the need to increase capacity through costly hardware upgrades.

The High Usage Mode may entail several changes to the end-user experience. Non-limiting examples include: reducing the number of images on a Web page, using images with smaller dimensions, using images having fewer (256 or less) colors, using static versus dynamic Web pages, replacing graphic icons with text links, reducing database calls by displaying less data, providing end-users with direct links to the most useful information, using smaller images, removing extraneous graphics, modifying the HTML base to be less complex and smaller in size by removing backward compatibility with older browsers, reducing or eliminating ads, and turning server logging off. The above noted changes each increase server capacity and/or reduces bandwidth requirements, and increases the web site scalability.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, may be applied to a serialization format other than XML, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be affected across a plurality of devices. Therefore, the present invention should not be limited to any single embodiment, but rather should be construed in breadth and scope in accordance with the appended claims.

What is claimed is:

1. A computer-implemented method for altering Web site content in accordance with the occurrence of an event, comprising:
   serving normal versions of Web pages;
   monitoring for a severe weather event that causes a high demand for said Web pages, the severe weather event associated with a particular geographic region; and
   upon the occurrence of said event automatically switching from a normal version of predetermined pages to an alternate version of said predetermined pages, the predetermined pages corresponding to the particular geographic region;
   serving the alternate versions of said predetermined pages in response to requests for the predetermined pages from users located in the geographic region;
   serving the normal version of the said predetermined pages in response to requests for the predetermined pages from users located outside the geographic region,
   wherein the normal versions have a first level of content, and the alternate versions have a second level of content that is less than the first level of content.

2. The method of claim 1, wherein all geographic regions are served an alternate version of the Web site home page.

3. The method of claim 1, wherein said second level of content comprises a reduced amount of graphics as compared to said first level of content.

4. The method of claim 3, wherein said graphics are displayed in 256 colors or less.

5. The method of claim 1, where said alternate versions are static Web pages.

6. The method of claim 5, further comprising reducing database calls for information to be supplied in said alternate versions.

7. The method of claim 1, further comprising:
   providing information related to said event in said alternate versions of a said predetermined pages; and
   providing only links to other information that would otherwise be displayed on said normal versions of said predetermined pages in said alternate versions.

8. The method of claim 1, further comprising modifying the HTML base in said alternate versions to reduce backward compatibility with older browsers that are supported by said normal versions.

9. The method of claim 1, wherein said alternate version communicates an urgency of said event.

10. The method of claim 1, wherein said event is non-recurring and causes an increase in demand for said predetermined pages.

11. A computer implemented method of increasing a number of pageviews that can be served by a Web server, comprising:
    monitoring for a severe weather event that causes a higher demand for predetermined pages served by the Web server, the severe weather event associated with a particular geographic region;
    preparing normal and alternate versions of said predetermined pages, said predetermined pages corresponding to the particular geographic region, the normal versions have a first level of content, and the alternate versions have a second level of content that is less than the first level of content;
    after sensing said event, switching from the normal version of said predetermined pages to said alternate version of said predetermined pages;
    serving said alternate versions of said predetermined pages to visitors of the Web site from geographic locations identified as being affected by said event; and
    serving said normal versions of said predetermined pages to visitors of the Web site from geographic locations identified as not affected by said event.

12. The method of claim 11, further comprising serving an alternate version of the Web site home page.

13. The method of claim 11, wherein said second level of content comprises a reduced amount of graphics as compared to said first level of content, and wherein said graphics are displayed in 256 colors or less.

14. The method of claim 11, further comprising reducing database calls for information to be supplied in said alternate versions and wherein said alternate versions are static Web pages.

15. A computer-implemented method of operating a Web site to adjust content served thereby in accordance with an event that causes higher user demand for predetermined pages, comprising:
    monitoring for current and/or forecasted severe weather events that cause higher user demand for said predetermined pages, the severe weather events associated with a particular geographic region;
    switching from a normal version of said predetermined pages to an alternate version of said predetermined pages after determining the existence of said severe weather event and/or a forecast of said severe weather event, the predetermined event;

serving said normal version of said predetermined pages in response to requests from users located outside the geographic region; and serving said alternate version of said predetermined pages in response to requests from users located inside the geographic region until said current event concludes and/or said forecast of said event concludes, and thereafter resuming serving said normal version of said predetermined pages in response to requests from within the geographic region.

16. The method of claim 15, further comprising serving said alternate version of said predetermined pages to specific classes of users visiting the site.

17. The method of claim 16, said specific classes of users comprise users from predetermined geographic regions where said event occurs and/or is forecasted to occur.

18. The method of claim 15, further comprising:
preparing said normal and said alternate versions of said predetermined pages in advance of said event, said normal version having a first level of content, and the alternate version having a second level of content that is less than the first level of content.

19. The method of claim 18, wherein said second level of content comprises a reduced amount of graphics as compared to said first level of content, and wherein said graphics are displayed in 256 colors or less.

20. The method of claim 18, further comprising reducing database calls for information to be supplied in said alternate version and wherein said alternate version is a static Web page.

21. The method of claim 1, wherein said event that causes said high demand for Web pages is a breaking news event in a geographic region.

22. The method of claim 1, wherein said method further comprises:
changing home pages of said alternative versions of said predetermined pages;
changing said alternate versions of said predetermined pages to include an event locator selector and changes to map looping; and
changing how said Web pages are placed into and out of said normal version and said alternate version.

23. The method of claim 1, wherein said alternate version of said predetermined Web pages is served in anticipation of said event.

24. The method of claim 23, wherein said alternate version of said predetermined Web pages is served to a geographic region based upon a severe weather forecast for said geographic region.

25. The method of claim 7, wherein said information related to said event communicates an urgency of said event.

* * * * *